US007697101B2

(12) United States Patent
Hong (10) Patent No.: US 7,697,101 B2
(45) Date of Patent: Apr. 13, 2010

(54) ARRAY SUBSTRATE AND LIQUID CRYSTAL DISPLAY DEVICE USING THE SAME WITH PARALLELOGRAMMIC PIXEL REGION

(75) Inventor: Soon-Kwang Hong, Dae-gu (KR)

(73) Assignee: LG Display Co., Ltd., Seoul (KR)

( * ) Notice: Subject to any disclaimer, the term of this patent is extended or adjusted under 35 U.S.C. 154(b) by 80 days.

(21) Appl. No.: 11/022,755

(22) Filed: Dec. 28, 2004

(65) Prior Publication Data

US 2005/0140893 A1 Jun. 30, 2005

(30) Foreign Application Priority Data

Dec. 29, 2003 (KR) .................... 10-2003-0099427

(51) Int. Cl.
*G02F 1/1343* (2006.01)
(52) U.S. Cl. ...................... 349/146; 349/145
(58) Field of Classification Search ................. 349/139, 349/109, 146, 145
See application file for complete search history.

(56) References Cited

U.S. PATENT DOCUMENTS

| | | | | |
|---|---|---|---|---|
| 4,373,784 A * | 2/1983 | Nonomura et al. | ......... | 349/145 |
| 4,811,003 A * | 3/1989 | Strathman et al. | ............. | 345/88 |
| 4,986,637 A * | 1/1991 | Yamaguchi | ................. | 349/109 |
| 5,223,962 A * | 6/1993 | Shioji et al. | ................. | 349/106 |
| 6,118,584 A * | 9/2000 | Van Berkel et al. | ......... | 359/463 |
| 6,661,488 B1 * | 12/2003 | Takeda et al. | ............... | 349/117 |
| 6,897,930 B2 * | 5/2005 | Nakayoshi et al. | .......... | 349/139 |
| 2004/0095528 A1 * | 5/2004 | Nakamura et al. | .......... | 349/106 |
| 2004/0201811 A1 * | 10/2004 | Jun | ............................. | 349/146 |
| 2007/0195253 A1 * | 8/2007 | Sonoda et al. | .............. | 349/146 |

* cited by examiner

*Primary Examiner*—David Nelms
*Assistant Examiner*—Nathanael R Briggs
(74) *Attorney, Agent, or Firm*—Morgan Lewis & Bockius LLP

(57) ABSTRACT

An array substrate for a liquid crystal display device includes: a gate line on a substrate along a first direction; a data line along a second direction and crossing the gate line, the crossing of the data line and the gate line defining a pixel region having a parallelogrammic shape; a thin film transistor connected to the gate line and the data line; and a pixel electrode in the pixel region and connected to the thin film transistor.

18 Claims, 10 Drawing Sheets

ARRAY SUBSTRATE AND LIQUID CRYSTAL DISPLAY DEVICE USING THE SAME WITH PARALLELOGRAMMIC PIXEL REGION

The present invention claims the benefit of Korean Patent Application No. 2003-0099427, filed in Korea on Dec. 29, 2003, which is hereby incorporated by reference.

BACKGROUND OF THE INVENTION

1. Field of the Invention

The present invention relates to a liquid crystal display device, and more particularly, to an array substrate and a liquid crystal display device using the array substrate.

2. Discussion of the Related Art

In general, the LCD devices include two substrates, each having electrodes that face each other, and a liquid crystal layer interposed between the electrodes. When a voltage is supplied to the electrodes, an electric field is generated to modulate light transmittance through the liquid crystal layer by reorienting the liquid crystal molecules, thereby displaying images. Among various types of LCD devices, active matrix liquid crystal display (AM-LCD) devices having thin film transistors (TFTs) and pixel electrodes arranged in matrix have been widely researched because of their superior resolution and capability to smoothly display moving images.

In a related art LCD device, a pixel electrode and a common electrode are positioned on a lower substrate and on an upper substrate, respectively. Thus, a longitudinal electric field is induced between the lower and upper substrates of the related art LCD device. This longitudinal electric field, which is perpendicular to the lower and upper substrates, drives liquid crystal molecules between the lower and upper substrates. Accordingly, the related art LCD device has superior light transmittance and aperture ratio. In addition, since the common electrode is grounded, breakdown of the liquid crystal cell is prevented.

Figure 1:
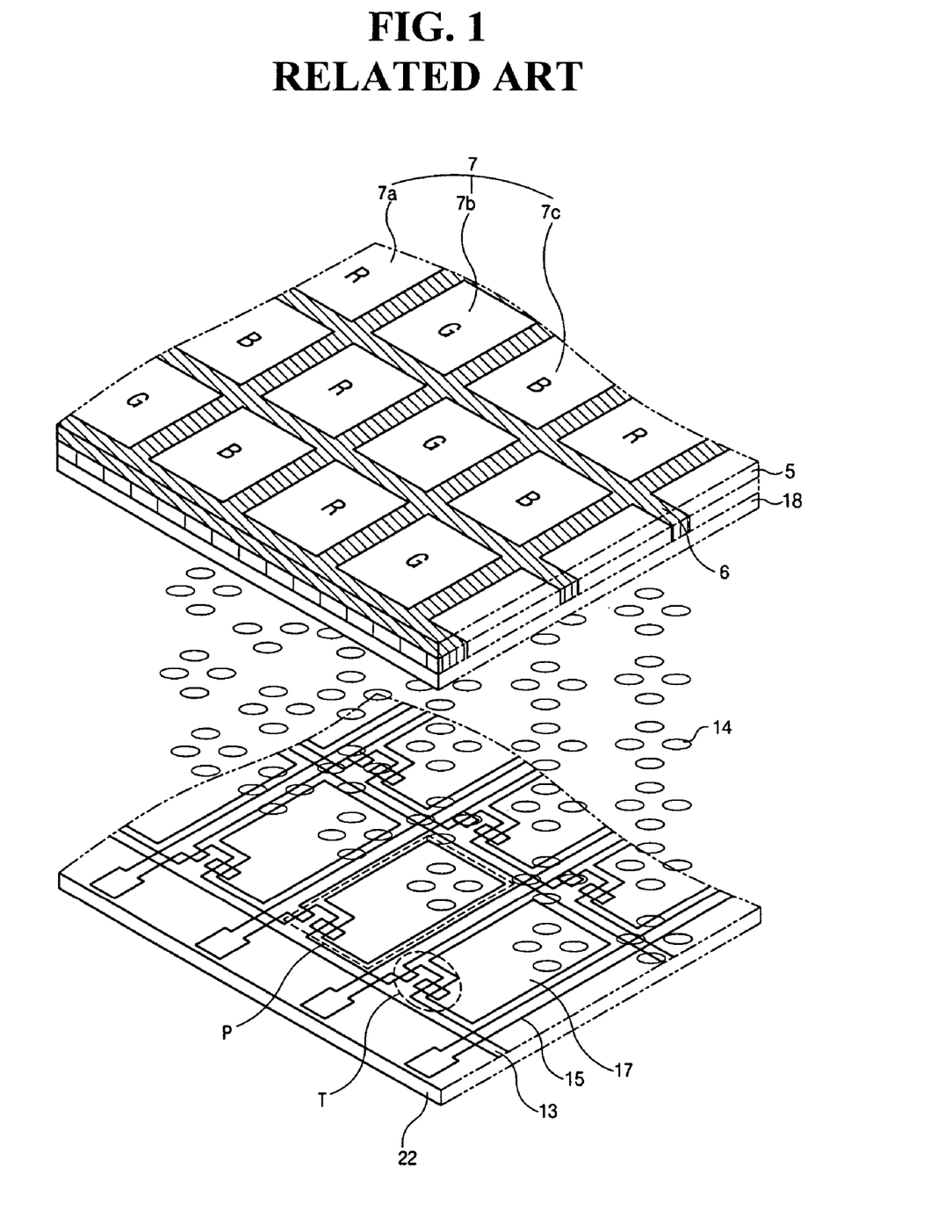
FIG. 1 is an exploded perspective view of a liquid crystal display device according to the related art.

FIG. 1 is an exploded perspective view of a liquid crystal display device according to the related art. In FIG. 1, a liquid crystal display (LCD) device includes a first substrate 22 and a second substrate 5, and a liquid crystal material 14 interposed therebetween. The first substrate 22 and the second substrate 5 face each other and are spaced apart from each other. A gate line 13 formed on the first substrate 22 crosses a data line 15 to define a pixel region "P." A thin film transistor (TFT) "T" used as a switching element is connected to the gate line 13 and the data line 15 within the pixel region "P." A pixel electrode 17 is also positioned in the pixel region "P" and connected to the TFT "T."

A black matrix 6 having an open portion corresponding to the pixel region "P" is formed on the second substrate 5 and a color filter layer 7 including one of red, green and blue sub-color filters 7a, 7b and 7c is formed in the open portion. The color filter layer corresponds to the pixel electrode 17. A common electrode 18 is formed on the black matrix 6 and the color filter layer 7. The first substrate 22 having the TFT "T" and the pixel electrode 17 may be referred to as an array substrate and the second substrate 5 having the color filter layer 7 may be referred to as a color filter substrate.

Figure 2:
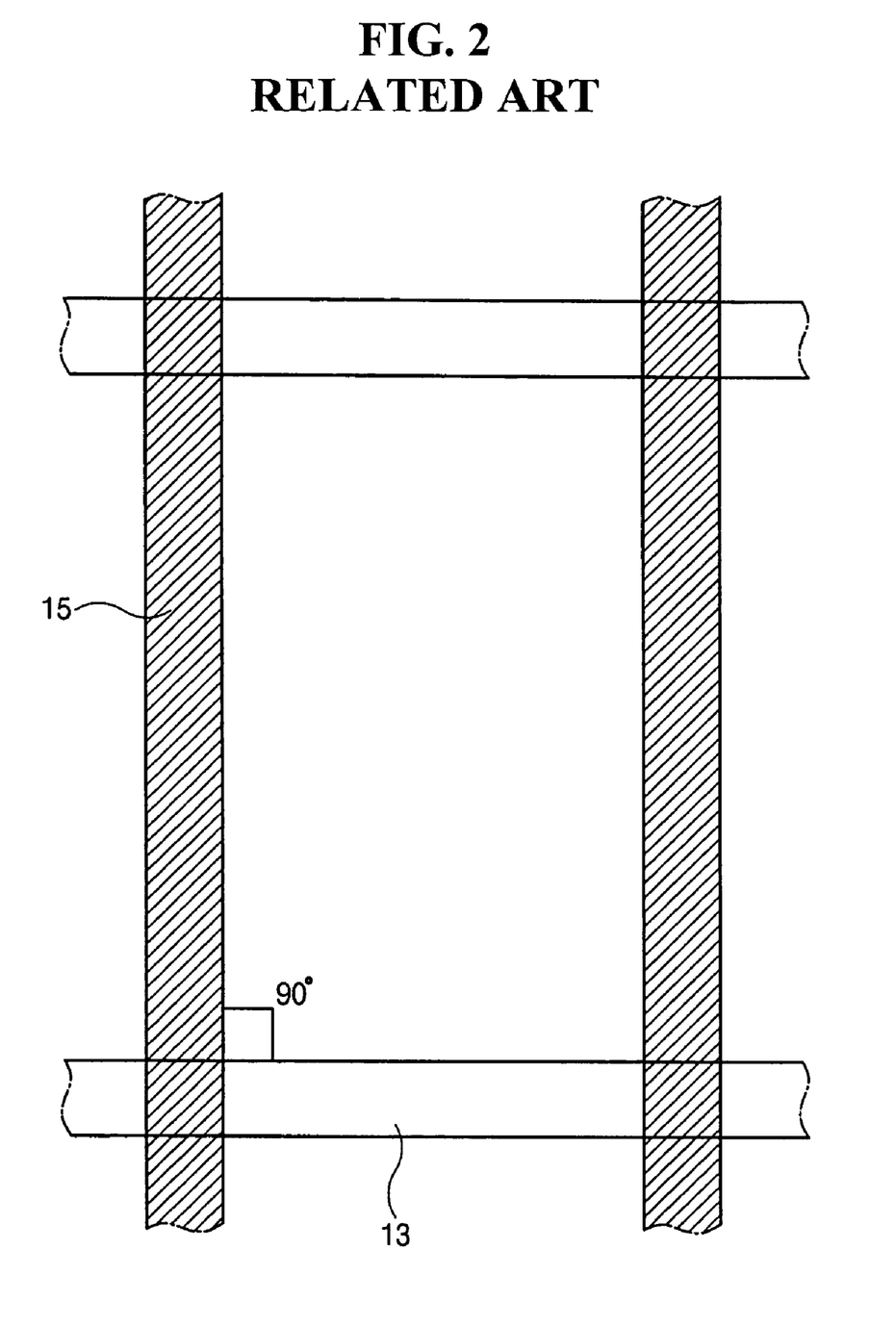
FIG. 2 is a plan view showing a pixel region of an array substrate for a liquid crystal display device according to the related art.

FIG. 2 is a plan view showing a pixel region of an array substrate for a liquid crystal display device according to the related art. In FIG. 2, a gate line 13 is disposed along a first direction and a data line 15 is disposed along a second direction perpendicular to the first direction. Accordingly, the gate line 13 and the data line 15 perpendicularly cross each other. Since the gate line 13 and the data line 15 are formed of a metallic material having relatively high reflectance, an incident light reflects from the gate line 13 and the data line 15. The light reflecting from the gate line 13 and the data line 15 makes an interference pattern having a wave shape due to the periodicity of the gate line 13 and the data line 15. The interference pattern may be referred to as a moire phenomenon that deteriorates the display quality of the LCD device.

SUMMARY OF THE INVENTION

Accordingly, the present invention is directed to an array substrate and a liquid crystal display device using the array substrate that substantially obviates one or more of the problems due to limitations and disadvantages of the related art.

An object of the present invention is to provide an array substrate for a liquid crystal display device having improved display quality and a liquid crystal display device using the array substrate.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes: a gate line on a substrate along a first direction; a data line along a second direction and crossing the gate line, the crossing of the data line and the gate line defining a pixel region having a parallelogrammic shape; a thin film transistor connected to the gate line and the data line; and a pixel electrode in the pixel region and connected to the thin film transistor.

In another aspect, a liquid crystal display device includes: first and second substrates facing each other and spaced apart from each other; a gate line on the first substrate along a first direction; a data line along a second direction and crossing the gate line, the crossing of the data line and the gate line defining a pixel region having a parallelogrammic shape; a thin film transistor connected to the gate line and the data line; a pixel electrode in the pixel region and connected to the thin film transistor; a color filter layer on the second substrate; and a common electrode on the color filter layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, an example of which is illustrated in the accompanying drawings.

Figure 3:
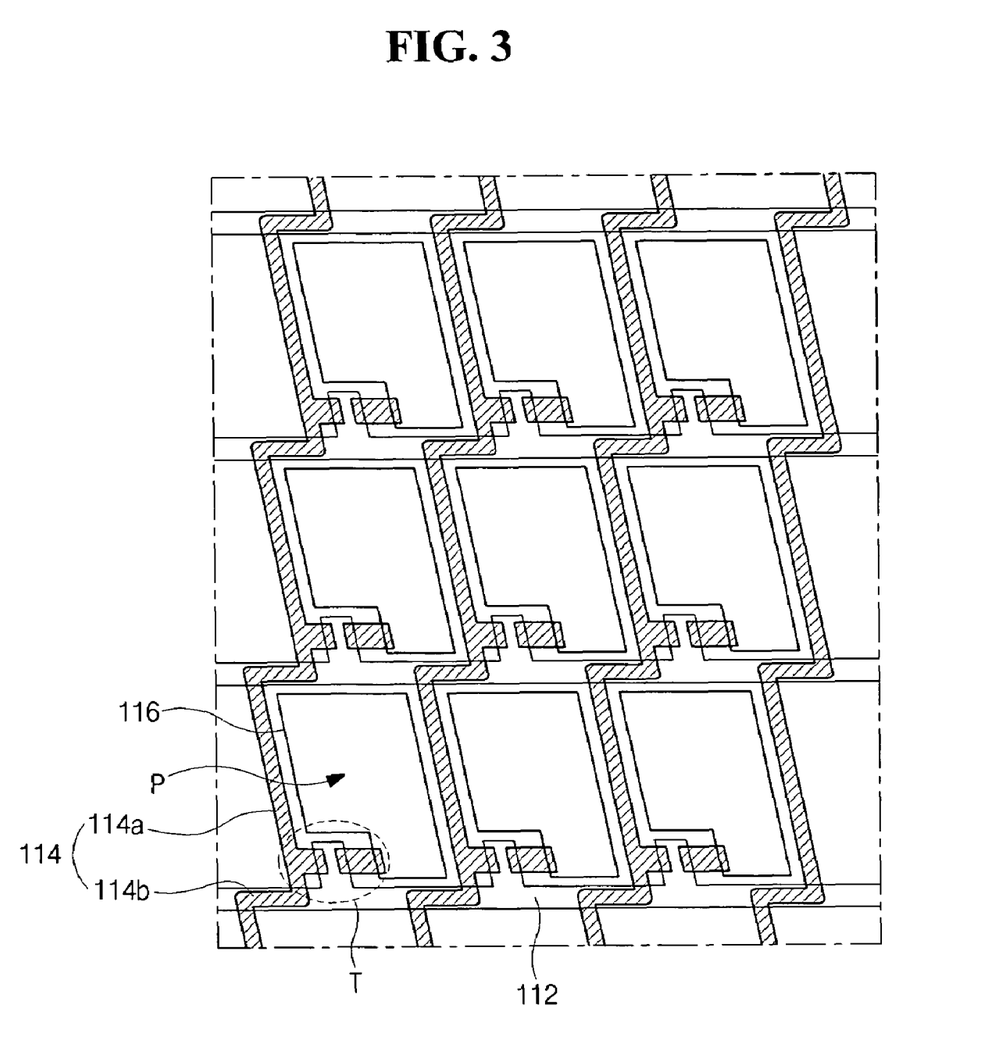
FIG. 3 is a plan view showing an array substrate for a liquid crystal display device according to an embodiment of the present invention.

FIG. 3 is a plan view showing an array substrate for a liquid crystal display device according to an embodiment of the present invention. As shown in FIG. 3, a gate line 112 is formed on a first substrate (not shown) along a first direction and a data line 114 is formed along a second direction. The gate line 112 crosses the data line 114 to define a pixel region "P." Since the gate line 112 has a straight shape and the data line 114 has a zigzag shape, the pixel region "P" has a parallelogrammic shape. The data line 114 includes a first portion 114a tilted with respect to a virtual line perpendicular to the gate line 112 and a second portion 114b parallel to the gate line 112. The second portion 114b is disposed at the corner of every pixel region "P." A thin film transistor (TFT) "T" is connected to the gate line 112 and the data line 114. The TFT "T" includes a gate electrode connected to the gate line 112, a source electrode connected to the data line 114 and a drain electrode spaced apart from the source electrode. A pixel electrode 116 connected to the drain electrode is formed within the pixel region "P."

The second portion 114b overlaps the gate line 112 in the embodiment shown in FIG. 3. However, the second portion 114b does not have to overlap the gate line 112 in other embodiments. Accordingly, the second portion 114b can be separated from the gate line 112 in plan view to minimize a signal delay due to parasitic capacitance between the gate line 112 and the data line 114.

Figure 4:
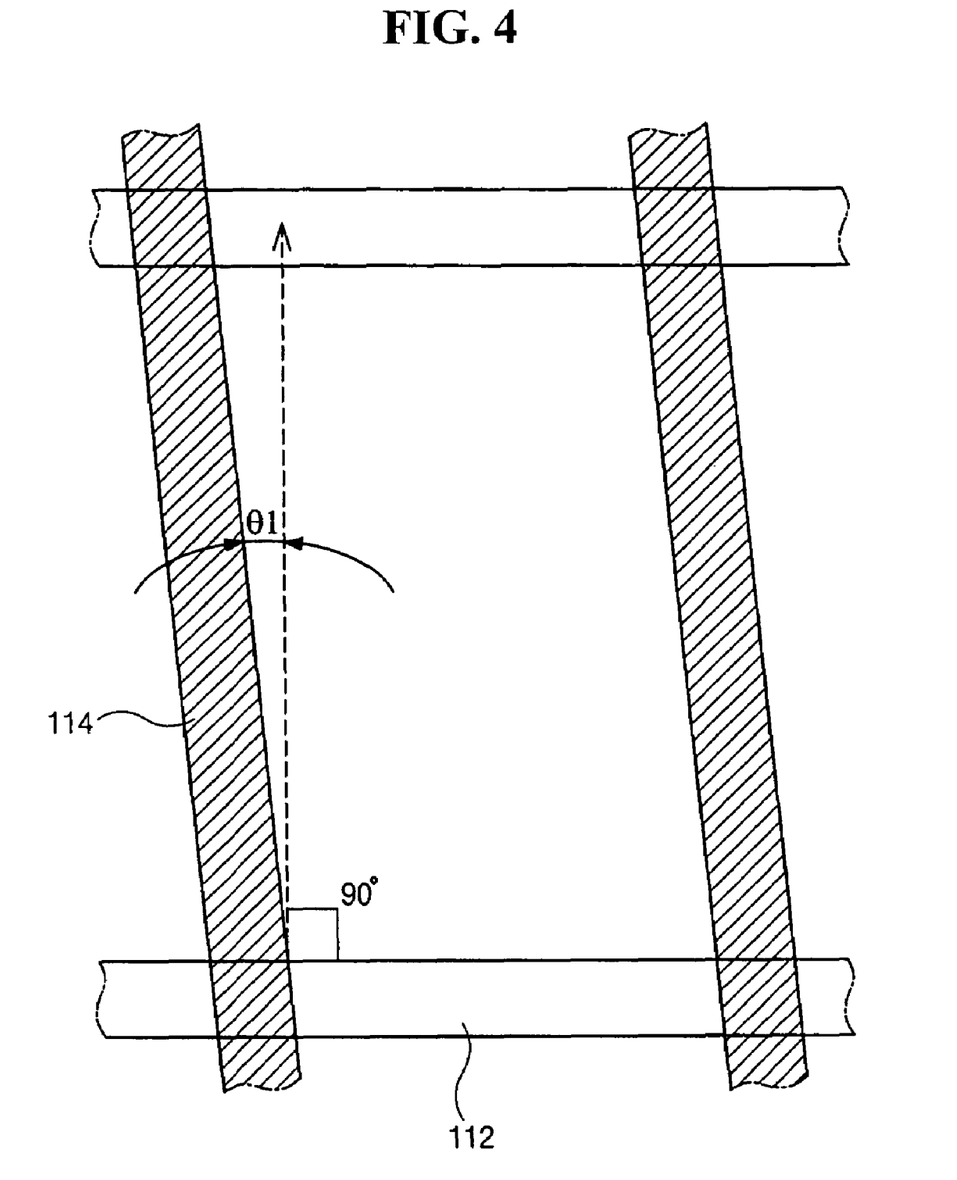
FIG. 4 is a plan view showing a pixel region of an array substrate for a liquid crystal display device according to an embodiment of the present invention.

FIG. 4 is a plan view showing a pixel region of an array substrate for a liquid crystal display device according to an embodiment of the present invention. As shown in FIG. 4, even though a data line 114 crosses a gate line 112, the data line 114 is tilted with respect to a virtual line perpendicular to the gate line 112. Accordingly, the data line 114 is not perpendicular to the gate line 112 and an angle between the gate line 112 and the data line 114 is not 90°. For example, the angle between the gate line 112 and the data line 114 may be about 90°+θ1, where θ1 is a tilt angle within a range of about 0° to about 10°, such as greater than 0° and smaller than 10°. In another embodiment, a tilt direction of the data line 114 may be in an opposite direction with respect to a virtual line perpendicular to the gate line 112. As a result, the data line 114 may cross the gate line 112 at a cross angle within ranges of about 80° to about 90° and about 90° to about 100°, such as a range of about 80° to about 100° except for 90°. In other words, the data line 114 may cross the gate line 112 with a cross angle greater than 800 and smaller than 90° or greater than 90° and smaller than 100°.

The gate line 112 and the data line 114 have a periodicity even when the gate line 112 and the data line 114 cross each other with a crossing angle other than 90°. However, since the periodicity when the gate line 112 and the data line 114 have a crossing angle other than 90° unlike when the gate line and the data line have a cross angle of 90°, an interference pattern is reduced while images are displayed. Accordingly, the moire phenomenon is reduced and display quality of an LCD device is improved.

In order to improve an aperture ratio of an LCD device, a black matrix of a color filter substrate for an LCD device may be omitted in embodiments of the present invention. In the related art where the gate line and the data line cross each other with a cross angle of 90°, the moire phenomenon becomes even more severe when the black matrix is omitted. However, the moire phenomenon is prevented in embodiments of the present invention by the gate line 112 and the data line 114 have a crossing angle other than 90°, even when the black matrix is omitted.

Figure 5:
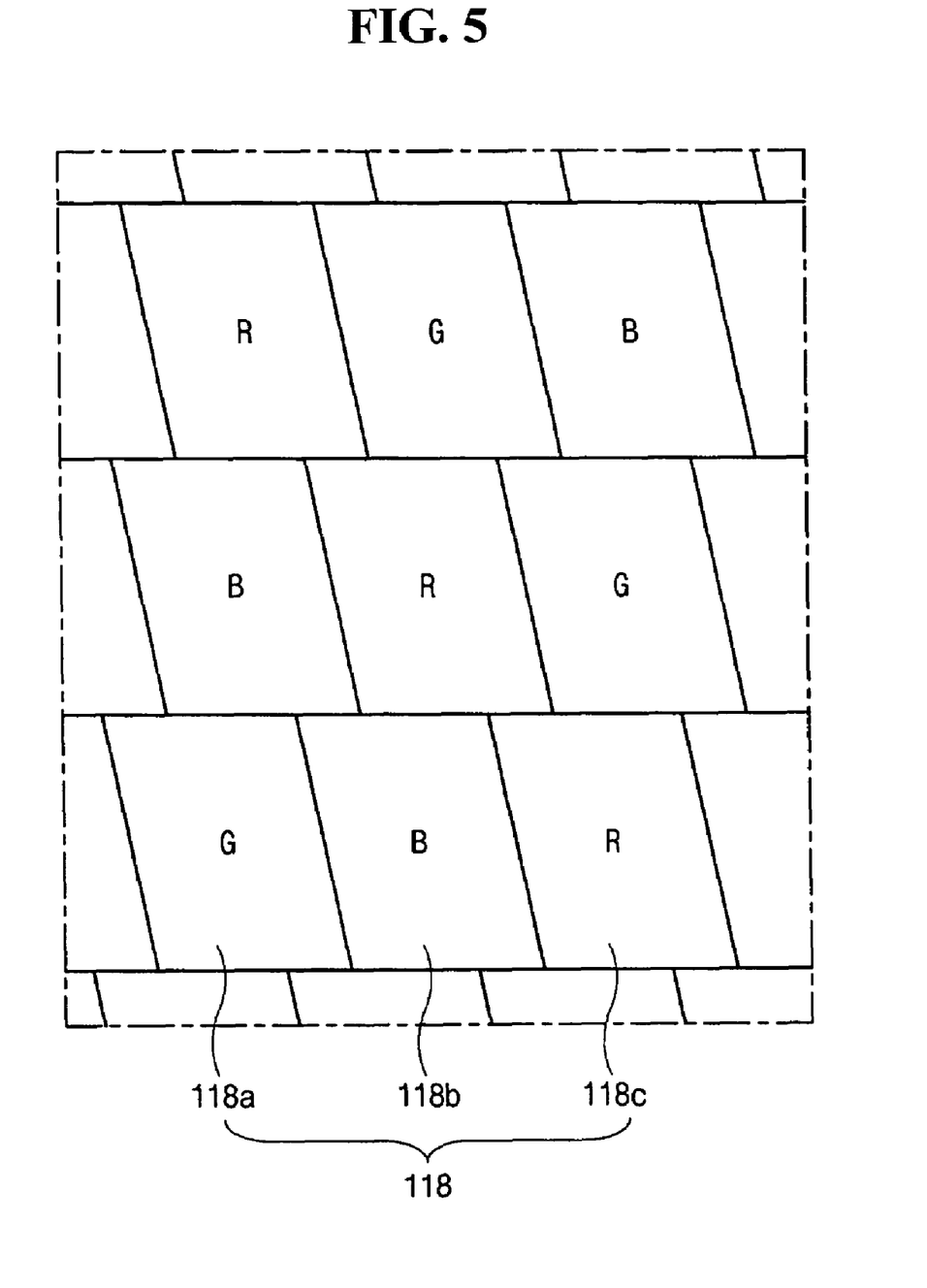
FIG. 5 is a plan view showing a color filter substrate for a liquid crystal display device according to an embodiment of the present invention.

FIG. 5 is a plan view showing a color filter substrate for a liquid crystal display device according to an embodiment of the present invention. As shown in FIG. 5, a color filter layer 118 including red (R), green (G) and blue (B) sub-color filters 118a, 118b and 118c is formed on a second substrate (not shown). The R, G and B sub-color filters 118a, 118b and 118c are alternately disposed. Each sub-color filter 118a, 118b and 118c has a parallelogrammic shape and corresponds to the pixel region "P" (of FIG. 3). Although not shown in FIGS. 3 and 4, when the pixel region "P" (of FIG. 3) has a parallelogrammic shape, a color filter layer may also have a parallelogrammic shape. A black matrix is omitted on the color filter substrate. A common electrode (not shown) of a transparent conductive material is formed on the color filter layer 118.

Embodiments of the present invention can be used in a transmissive LCD device, a reflective LCD device or a transflective LCD device. The moire phenomenon is more severe in a reflective LCD device and a transflective LCD device because an ambient light is used as a light source. However, the moire phenomenon is prevented and display quality is improved by the gate line 112 and the data line 114 having a crossing angle of other than 90° in a reflective LCD device and a transflective LCD device.

Figure 6:
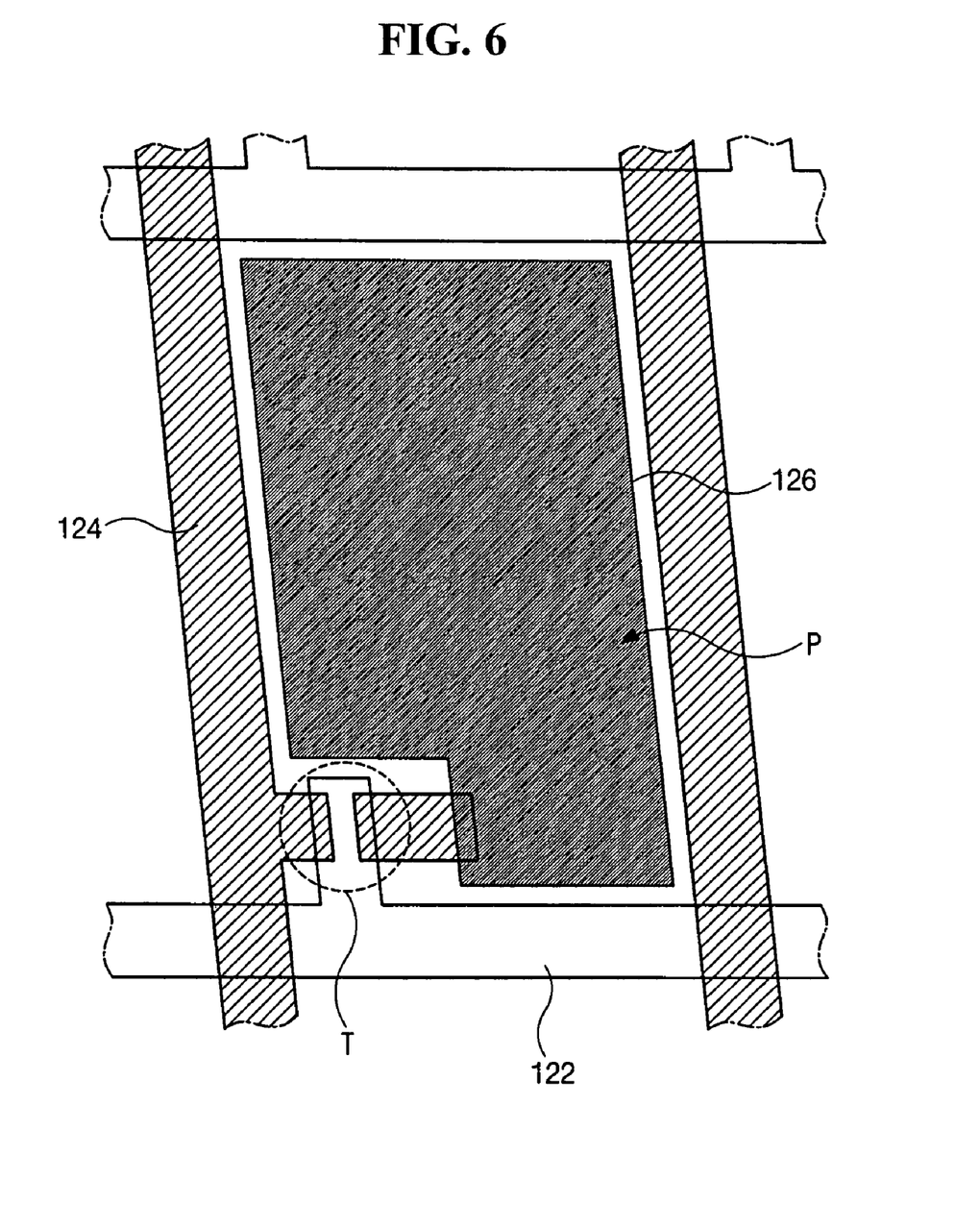
FIG. 6 is a plan view showing a pixel region of an array substrate for a reflective liquid crystal display device according to an embodiment of the present invention.

FIG. 6 is a plane view showing a pixel region of an array substrate for a reflective liquid crystal display device according to an embodiment of the present invention. As shown in FIG. 6, a gate line 122 is formed on a first substrate (not shown) along a first direction and a data line 124 is formed along a second direction. The gate line 122 crosses the data line 124 to define a pixel region "P." The data line 124 is tilted with respect to a virtual line perpendicular to the gate line 122. Accordingly, the data line 124 is not perpendicular to the gate line 122 and an angle between the gate line 122 and the data line 124 is not 90°. In addition, the pixel region "P" has a parallelogrammic shape. A thin film transistor (TFT) "T" is connected to the gate line 122 and the data line 124. The TFT "T" includes a gate electrode connected to the gate line 122, a source electrode connected to the data line 124 and a drain electrode spaced apart from the source electrode. A pixel electrode 126 connected to the drain electrode is formed in the pixel region "P." The pixel electrode 126 includes a metallic material having a relatively high reflectance to reflect an ambient light. Moreover, the pixel electrode 126 may have an unevenness on a surface thereof to prevent mirror reflection.

Since a periodic disposition of convex portions of the unevenness causes a moire phenomenon, the convex portions can be randomly disposed to prevent the moire phenomenon.

Figure 7:
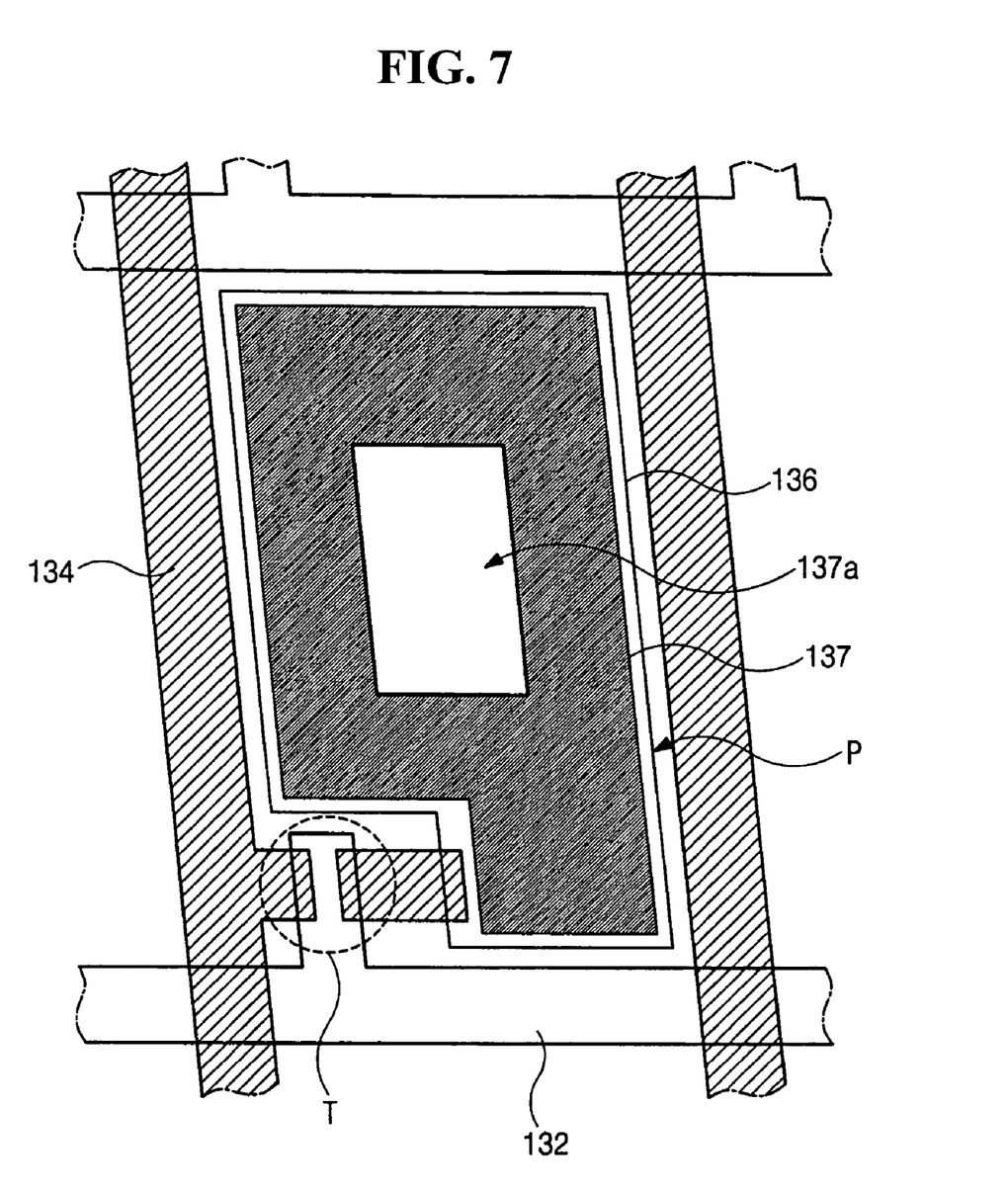
FIG. 7 a plan view showing a pixel region of an array substrate for a transflective liquid crystal display device according to an embodiment of the present invention.

FIG. 7 is a plan view showing a pixel region of an array substrate for a transflective liquid crystal display device according to an embodiment of the present invention. As shown in FIG. 7, a gate line 132 is formed on a first substrate (not shown) along a first direction and a data line 134 is formed along a second direction. The gate line 132 crosses the data line 134 to define a pixel region "P." The data line 134 is tilted with respect to a virtual line perpendicular to the gate line 132. Accordingly, the data line 134 is not perpendicular to the gate line 132 and an angle between the gate line 132 and the data line 134 is not 90°. In addition, the pixel region "P" has a parallelogrammic shape. A thin film transistor (TFT) "T" is connected to the gate line 132 and the data line 134. The TFT "T" includes a gate electrode connected to the gate line 132, a source electrode connected to the data line 134 and a drain electrode spaced apart from the source electrode. A pixel electrode 136 connected to the drain electrode is formed in the pixel region "P." The pixel electrode 136 includes a transparent conductive material. Moreover, a reflective plate 137 having an open portion 137a is also formed in the pixel region "P." The reflective plate 137 can be connected to the drain electrode of the TFT "T." As in a reflective LCD device, the reflective plate 137 may have an unevenness on a surface thereof to prevent mirror reflection. Since a periodic disposition of convex portions of the unevenness causes a moire phenomenon, the convex portions may be randomly disposed to prevent the moire phenomenon.

In embodiments of the present invention, a data line having a zigzag shape is tilted with respect to a virtual line perpendicular to a gate line. In an LCD device according to other embodiments of the present invention, a gate line having a zigzag shape is tilted with respect a virtual line perpendicular to a data line.

Figure 8:
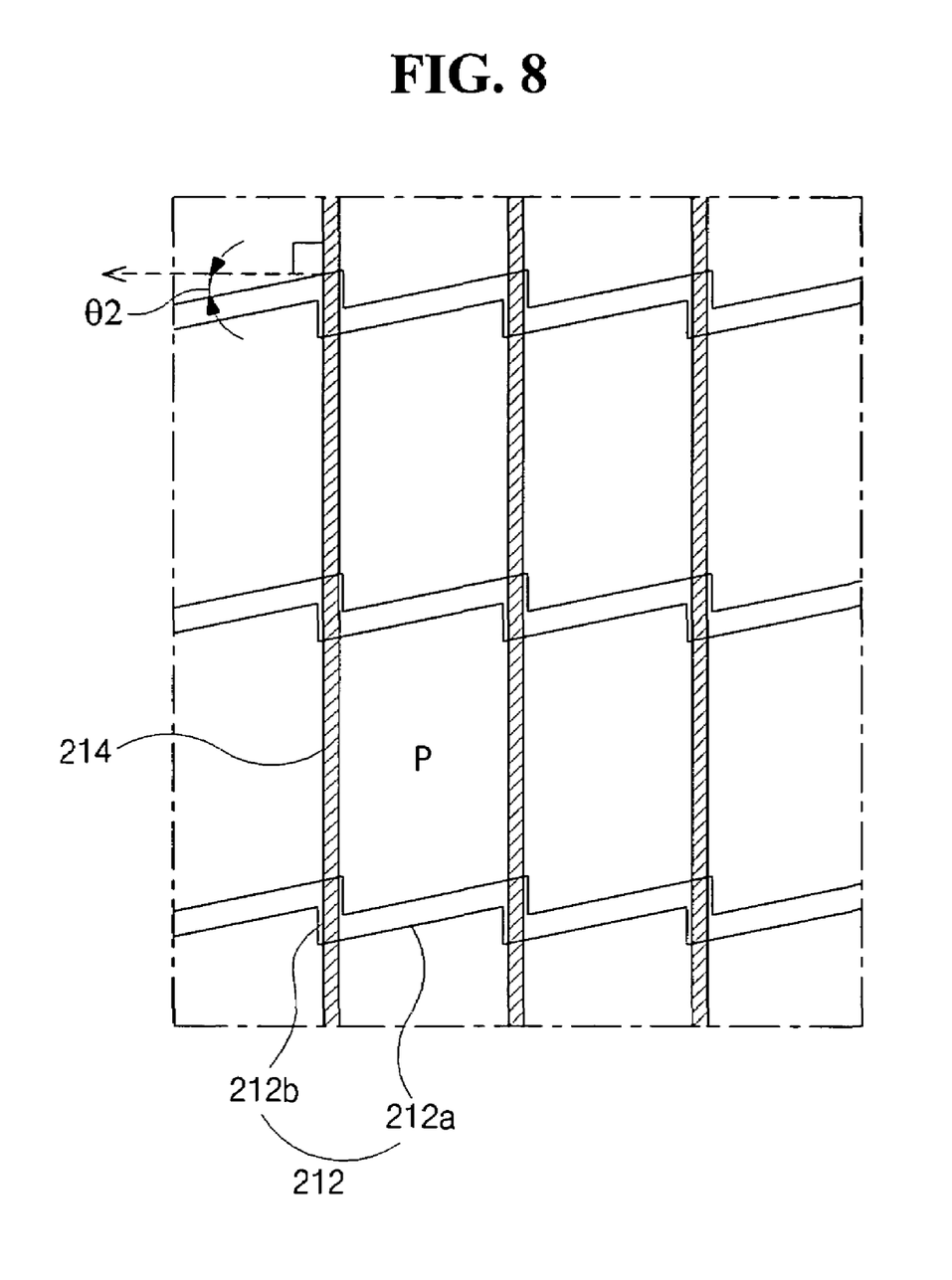
FIG. 8 is a plan view showing an array substrate for a liquid crystal display device according to an embodiment of the present invention.

FIG. 8 is a plan view showing an array substrate for a liquid crystal display device according to a second embodiment of the present invention. As shown in FIG. 8, a gate line 212 is formed on a substrate along a first direction and a data line 214 is formed along a second direction. The gate line 212 and the data line 214 cross each other to define a pixel region "P." Since the gate line 212 has a zigzag shape and the data line 214 has a straight shape, the pixel region "P" has a parallelogrammic shape. The gate line 212 includes a first portion 212a tilted with respect to a virtual line perpendicular to the data line 214 and a second portion 212b parallel to the data line 214.

The second portion 212b overlaps the data line 214 in FIG. 8. However, the second portion 212b does not have to overlap the data line 214 in other embodiments. Accordingly, the second portion 212b can be separated from the data line 214 in a plan view to minimize a signal delay due to a parasitic capacitance between the gate line 212 and the data line 214. The second portion 212b is disposed at a corner of every pixel region "P."

Even though not shown in FIG. 8, a thin film transistor (TFT) is connected to the gate line 212 and the data line 214 and a pixel electrode connected to the TFT is formed in the pixel region "P." The TFT "T" includes a gate electrode connected to the gate line 112, a source electrode connected to the data line 114 and a drain electrode spaced apart from the source electrode. A pixel electrode 116 connected to the drain electrode is formed in the pixel region "P."

The gate line 214 is tilted with respect to a virtual line perpendicular to the data line 214. Accordingly, the gate line 214 is not perpendicular to the data line 214 and an angle between the gate line 212 and the data line 214 is not 90°. For example, the angle between the gate line 212 and the data line 214 may be about 90°+θ2, where θ2 is a tilt angle within a range of about 0° to about 10°. In addition, a tilt direction of the gate line 214 may be in the opposite direction with respect to a virtual line perpendicular to the data line 214 in other embodiments. As a result, the gate line 212 may cross the data line 214 with a cross angle within ranges of about 80° to about 90° and about 90° to about 100°, such as a range of about 80° to about 100° that does not include 90°. Furthermore, a color filter layer of an LCD device may also have a parallelogrammic shape corresponding to the pixel region "P."

In embodiments of the present invention shown in FIGS. 3 to 8, a periodicity of a gate line and a data line is with respect to each pixel region. In another embodiment, a gate line and a data line may be disposed to have a periodicity with respect to two or more pixel regions.

Figure 9:
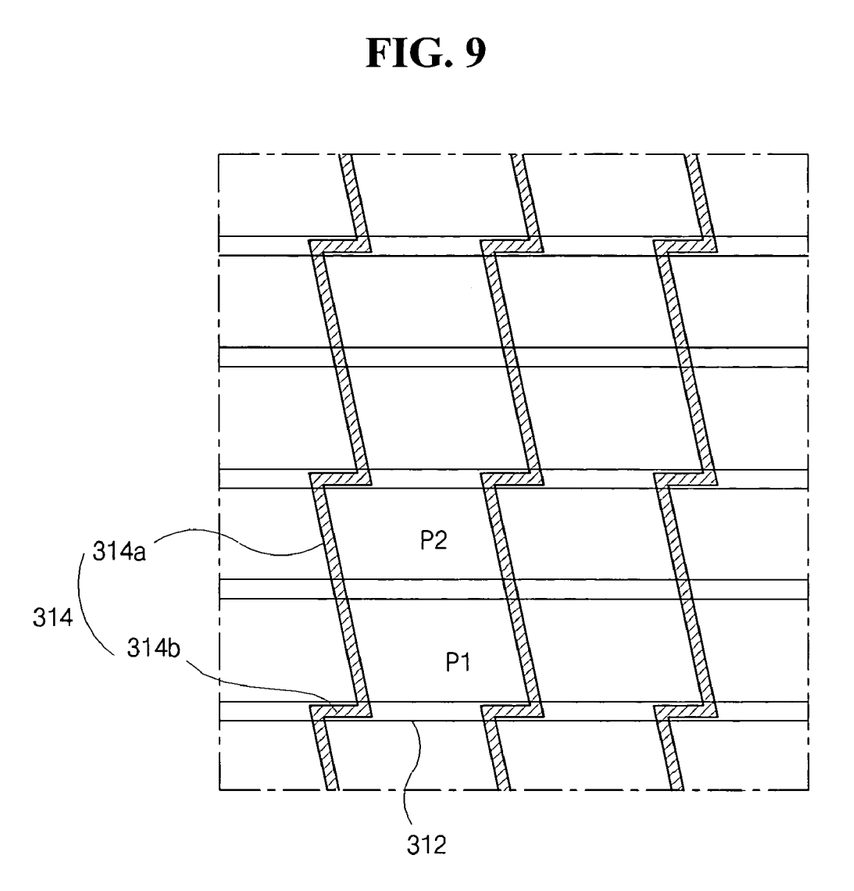
FIG. 9 is a plan view showing an array substrate for a liquid crystal display device according to an embodiment of the present invention.

FIG. 9 is a plan view showing an array substrate for a liquid crystal display device according to an embodiment of the present invention. As shown in FIG. 9, a gate line 312 is formed on a substrate (not shown) along a first direction and a data line 314 is formed along a second direction. The gate line 312 and the data line 314 cross each other to define a pixel region "P1" or "P2." In addition, the gate line 312 has a straight shape and the data line 314 has a zigzag shape. The data line 314 includes a first portion 314a tilted with respect to a virtual line perpendicular to the gate line 312 and a second portion 314b parallel to the gate line 312. The second portion 314b is disposed for every two pixel regions "P1" and "P2" along the second direction.

Accordingly, a periodicity of the zigzag shape for the data line 314 corresponds to the two adjacent pixel regions "P1" and "P2" along the second direction. As a result, each of the adjacent pixel regions "P1" and "P2" has a parallelogrammic shape and the two adjacent pixel regions "P1" and "P2" together as a whole also have a parallelogrammic shape.

The second portion 314b overlaps the gate line 312 in FIG. 9. However, the second portion 314b does not have to overlap the gate line 312 in other embodiments. Accordingly, the second portion 314b can be separated from the gate line 312 in a plan view to minimize a signal delay due to a parasitic capacitance between the gate line 312 and the data line 314.

Figure 10:
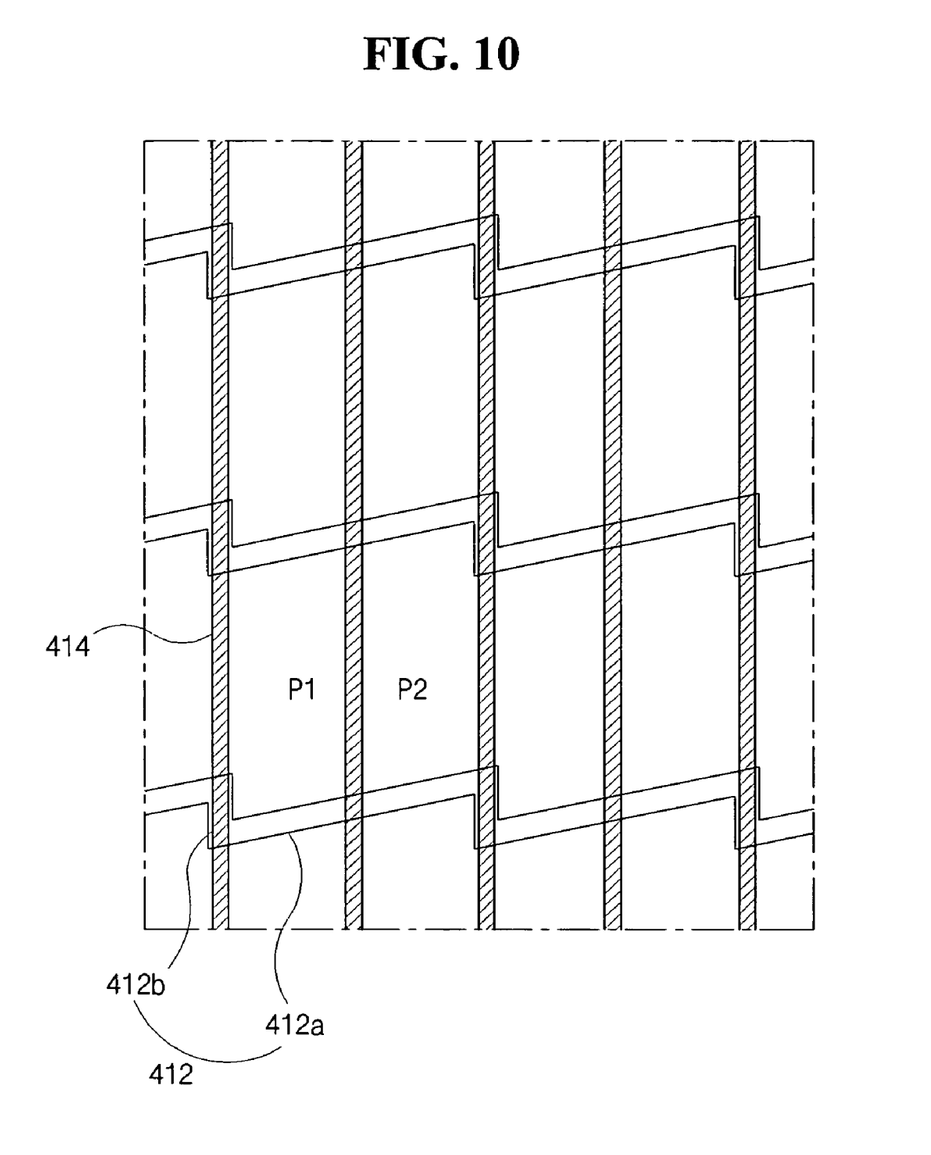
FIG. 10 is a plan view showing an array substrate for a liquid crystal display device according to an embodiment of the present invention.

FIG. 10 is a plan view showing an array substrate for a liquid crystal display device according to an embodiment of the present invention. As shown in FIG. 10, a gate line 412 is formed on a substrate (not shown) along a first direction and a data line 414 is formed along a second direction. The gate line 412 and the data line 414 cross each other to define a pixel region "P1" or "P2." The gate line 412 has a zigzag shape and the data line 414 has a straight shape. The gate line 412 includes a first portion 412a tilted with respect to a virtual line perpendicular to the data line 414 and a second portion 412b parallel to the data line 414. The second portion 412b is disposed for every two adjacent pixel regions "P1" and "P2" along the first direction. Moreover, since a periodicity of the zigzag shape for the gate line 412 corresponds to every two adjacent pixel regions "P1" and "P2" along the first direction, each of the adjacent pixel regions "P1" and "P2" has a parallelogrammic shape and the two adjacent pixel regions "P1" and "P2" together as a whole also have a parallelogrammic shape.

The second portion 412b overlaps the data line 414 in FIG. 10. However, the second portion 412b does not have to overlap the data line 414 in other embodiments. Accordingly, the second portion 412b may be separated from the data line 414 in a plan view to minimize a signal delay due to a parasitic capacitance between the gate line 412 and the data line 414.

Although not shown in FIGS. 9 and 10, the gate line 312 and the data line 314 have a crossing angle within ranges of about 80° to about 90° and about 90° to about 100°, such as a range of about 80° to about 100° not including 90°, and the gate line 412 and the data line 414 can have a crossing angle within ranges of about 80° to about 90° and about 90° to about 100°, such as a range of about 80° to about 100° not including 90°. In addition, the data line 314 is tilted with respect to a virtual line perpendicular to the gate line 312 with a tilt angle within a range of about 0° to about 10° in FIG. 9, and the gate line 412 is tilted with respect to a line perpendicular to the data line 414 with a tilt angle within a range of about 0° to about 10° in FIG. 10. Thus, in an LCD device according to embodiments of the present invention, since a gate line is not perpendicular to a data line, an interference pattern (moire phenomenon) due to a periodicity of the gate line and the data line is prevented and display quality of the LCD device is improved.

It will be apparent to those skilled in the art that various modifications and variations can be made in the array substrate and the liquid crystal display device using the same of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
   first and second gate lines on a substrate along a first direction;
   first and second data lines along a second direction and crossing the first and second gate lines to form a pixel region having a parallelogrammic shape;
   first to fourth thin film transistors respectively connected to the first gate and data lines, the first gate line and the second data line, the second gate line and the first data line, and the second gate and data lines; and
   first to fourth pixel electrodes in the pixel regions and respectively connected to the first to fourth thin film transistors,
   wherein each of the first and second data lines has a zigzag shape and each of the gate lines has a straight line shape, and a bent portion of the zigzag shape is disposed at a crossing portion of the gate and data lines, and wherein each of the gate and data lines has a straight line between adjacent two crossing portions of the gate and data lines, and wherein all thin film transistors connected to a single data line are disposed on a virtual straight line perpendicular to the gate line.

2. The substrate according to claim 1, wherein the gate line crosses the data line with a crossing angle greater than 80° and smaller than 100° but not equal to 90°.

3. The substrate according to claim 1, wherein the data line has a zigzag shape.

4. The substrate according to claim 3, wherein two adjacent pixel regions together along the second direction have a parallelogrammic shape as a whole.

5. The substrate according to claim 3, wherein the data line has a first portion tilted with respect to a virtual line perpendicular to the gate line and a second portion parallel to the gate line.

6. The substrate according to claim 5, wherein the second portion is separated from the gate line in a plan view.

7. The substrate according to claim 5, wherein the tilted first portion is disposed along two adjacent pixel regions.

8. The substrate according to claim 1, wherein the gate line has a zigzag shape.

9. The substrate according to claim 8, wherein two adjacent pixel regions together along the first direction have a parallelogrammic shape as a whole.

10. The substrate according to claim 8, wherein the gate line has a first portion tilted with respect to a virtual line perpendicular to the data line and a second portion parallel to the data line.

11. The substrate according to claim 10, wherein the second portion is separated from the data line in a plan view.

12. The substrate according to claim 10, wherein the tilted first portion is disposed along two adjacent pixel regions.

13. The substrate according to claim 1, wherein the pixel electrode includes a material for reflecting light that has an uneven surface to prevent mirror reflection.

14. The substrate according to claim 1, further comprising a reflecting plate in the pixel region, the reflecting plate having an open portion and the pixel electrode including a transparent conductive material.

15. A liquid crystal display device, comprising:
   first and second substrates facing each other and spaced apart from each other;
   first and second gate lines on the first substrate along a first direction;
   first and second data lines along a second direction and crossing the first and second gate lines to form a pixel region having a parallelogrammic shape;
   first to fourth thin film transistors respectively connected to the first gate and data lines, the first gate line and the second data line, the second gate line and the first data line, and the second gate and data lines;
   first to fourth pixel electrodes in the pixel regions and respectively connected to the first to fourth thin film transistors;
   a color filter layer on the second substrate; and
   a common electrode on the color filter layer,
   wherein each of the first and second data lines has a zigzag shape and each of the gate lines has a straight line shape, and a bent portion of the zigzag shape is disposed at a crossing portion of the gate and data lines, wherein each of the gate and data lines has a straight line between adjacent two crossing portions of the gate and data lines, and wherein all thin film transistors connected to a single data line are disposed on a virtual straight line perpendicular to the gate line.

16. The device according to claim 15, wherein the color filter layer includes one of a red, green and blue sub-color filters, the color filter layer corresponding to the pixel region and having a parallelogrammic shape.

17. The device according to claim 15, wherein the gate line crosses the data line with a cross angle greater than 80° and smaller than 100° but not equal to 90°.

18. The device according to claim 15, further comprising a reflecting plate in the pixel region, the reflecting plate having an open portion and the pixel electrode including a transparent conductive material.

* * * * *